(12) United States Patent
Koo et al.

(10) Patent No.: US 12,443,345 B2
(45) Date of Patent: Oct. 14, 2025

(54) MULTI-LEVEL DATA STORAGE DEVICE AND OPERATION METHOD THEREOF

(71) Applicants: SK hynix Inc., Icheon (KR); Korea Advanced Institute of Science and Technology, Daejeon (KR)

(72) Inventors: Kyoungho Koo, Daejeon (KR); Youjip Won, Daejeon (KR)

(73) Assignees: SK hynix Inc., Icheon (KR); Korea Advanced Institute of Science and Technology, Daejeon (KR)

( * ) Notice: Subject to any disclaimer, the term of this patent is extended or adjusted under 35 U.S.C. 154(b) by 58 days.

(21) Appl. No.: 18/453,967

(22) Filed: Aug. 22, 2023

(65) Prior Publication Data
US 2024/0192853 A1    Jun. 13, 2024

(30) Foreign Application Priority Data

Dec. 13, 2022  (KR) .......................... 10-2022-0174131
Jul. 28, 2023  (KR) .......................... 10-2023-0098624

(51) Int. Cl.
*G06F 3/06*    (2006.01)

(52) U.S. Cl.
CPC ............ *G06F 3/061* (2013.01); *G06F 3/0653* (2013.01); *G06F 3/0673* (2013.01); *G06F 2212/7208* (2013.01)

(58) Field of Classification Search
CPC ...... G06F 3/061; G06F 3/0653; G06F 3/0673; G06F 3/064; G06F 3/0659; G06F 2212/7208
See application file for complete search history.

(56) References Cited

U.S. PATENT DOCUMENTS 10,761,777 B2    9/2020  Malina et al.
2009/0019243 A1*  1/2009  Hur ........................ G06F 1/3287
                                                                711/158

(Continued)

FOREIGN PATENT DOCUMENTS

KR          102264119 B1      6/2021

OTHER PUBLICATIONS

Ashok Anand et al., "Cheap and Large CAMS for High Performance Data-Intensive Networked Systems", NSDI '10: 7th USENIX Symposium on Networked Systems Design and Implementation, Apr. 28-30, 2010, vol. 10, pp. 433-448, San Jose, CA.

(Continued)

*Primary Examiner* — Kalpit Parikh (57) ABSTRACT

A multi-level data storage device includes a first storage device; a second storage device located at a lower level than the first storage device; an input/output (I/O) control circuit configured to control a first write operation for the first storage device and a second write operation for the second storage device; and an imbalance control circuit configured to calculate an imbalance index corresponding to a write set that is generated when a sum of a number of first write operations and a number of the second write operations becomes a predetermined number, and configured to control the I/O control circuit to control imbalance of write operations performed in the multi-level data storage device by controlling the first write operation or the second write operation based on the imbalance index.

11 Claims, 5 Drawing Sheets

(56) References Cited

U.S. PATENT DOCUMENTS

| | | | | |
|---|---|---|---|---|
| 2013/0031307 | A1* | 1/2013 | Itoh | G06F 3/0689 |
| | | | | 711/E12.019 |
| 2019/0035473 | A1* | 1/2019 | Rajamani | G06F 3/0679 |
| 2019/0384528 | A1* | 12/2019 | Grosz | G06F 3/0611 |

OTHER PUBLICATIONS

Timothy G. Armstrong et al., "Linkbench: a Database Benchmark Based on the Facebook Social Graph," In Proceedings of the 2013 ACM SIGMOD Inter-national Conference on Management of Data, Jun. 22-27, 2013, pp. 1185-1196, New York, New York.

Andrew Audibert, "Scalable Metadata Service in Alluxio: Storing Billions of Files," May 10, 2019, https://www.alluxio.io/blog/scalable-metadata-service-in-alluxio-storing-billions-of-files/.

Oana Balmau et al., "SILK: Preventing latency spikes in Log-Structured merge Key-Value stores," 2019 USENIX Annual Technical Conference, Jul. 10-12, 2019, pp. 753-766, https://www.usenix.org/conference/atc19/presentation/balmau.

Oana Balmau et al. "Silk+ preventing latency spikes in log-structured merge key-value stores running heterogeneous workloads", ACM Transactions on Computer Systems (TOCS), May 2020, 36(4), p. 1-27, https://dl.acm.org/doi/10.1145/3380905.

Doug Beaver et al., "Finding a needle in haystack: Facebook's photo storage," in the Proceedings of the 9th USENIX Symposium on Operating Systems Design and Implementation (OSDI '10), Oct. 4-6, 2010, pp. 47-60.

Zhichao Cao et al., "Characterizing, Modeling, and Benchmarking rocksDB Key-Value Workloads at Facebook," in the Proceedings of the 18th USENIX Conference on File and Storage Technologies (FAST '20), Feb. 25-27, 2020, pp. 209-223.

Fay Chang et al., "Bigtable: A distributed storage system for structured data," ACM Transactions on Computer Systems (TOCS), Jun. 2008, vol. 26, No. 2, pp. 1-26.

Hao Chen et al. "SpanDB: A Fast, Cost-Effective LSM-tree Based KV Store on Hybrid Storage", 19th USENIX Conference on File and Storage Technologies., Feb. 23-25, 2021, pp. 17-32, https://www.usenix.org/conference/fast21/presentation/chen-hao.

Austin T. Clements et al. "Scalable Address Spaces Using RCU Balanced Trees", In Architectural Support for Programming Languages and Operating Systems, Mar. 3-7, 2012, pp. 199-210.

Brian F. Cooper et al. "Pnuts: Yahoo!'s Hosted Data Serving Platform," PVLDB '08, 2008, 1(2), Aug. 23-28, 2008, pp. 1277-1288, Auckland, New Zealand.

Brian F. Cooper et al., "Benchmarking Cloud Serving Systems with YCSB," In Proceeding of the 1st ACM Symposium on Cloud computing (SoCC '10), Jun. 10-11, 2010, pp. 143-154.

Biplob Debnath et al., "Flashstore: High Throughput Persistent Key-Value Store," Proceedings of the VLDB Endowment, vol. 3, No. 2, 2010, pp. 1414-1425.

Biplob Debnath et al., "Skimpystash: Ram space skimpy key-value store on flash-based storage," In Proceedings of the 2011 ACM SIGMOD International Conference on Management of data, Jun. 12-16, 2011, pp. 25-36.

Giuseppe DeCandia et al., "Dynamo: Amazon's highly available key-value store," ACM SIGOPS operating systems review, 41(6):205-220, 2007, pp. 205-220.

Krijn Doekemeijer and Animesh Trivedi, "Key-value stores on flash storage devices: A survey," May 11, 2022, pp. 1-38, arXiv preprint arXiv:2205.07975, 2022.

Tyler Harter et al., "Analysis of HDFS under HBase: A facebook messages case study," In 12th USENIX Conference on File and Storage Technologies (FAST 14), Feb. 17-20, 2014, pp. 199-212.

Gui Huang et al., "X-Engine: An optimized storage engine for large-scale e-commerce transaction processing," In Proceedings of the 2019 International Conference on Management of Data (SIGMOD '19), Jun. 30-Jul. 5, 2019, pp. 651-665.

J Stuart Hunter, "The exponentially weighted moving average," Journal of quality technology, 18(4):203-210, 1986.

Junsu Im, et al . . . "Pink: High-speed in-storage key-value store with bounded tails," In 2020 USENIX Annual Technical Conference (USENIX ATC 20), pp. 173-187, 2020.

"Intel Optane memory—Responsive Memory, Accelerated Performance," 2021, https://www.intel.com/content/www/us/en/products/details/memory-storage/optane-memory.html.

"Optane ssd 905p," 2022, https://www.intel.co.kr/content/www/kr/ko/products/sku/148607/intel-optane-ssd-905p-series-380gb-m-2-110mm-pcie-x4-20nm-3d-xpoint/specifications.html.

Krish K.R. et al., "hats: A heterogeneity-aware tiered storage for hadoop," In 2014 14th IEEE/ACM International Symposium on Cluster, Cloud and Grid Computing, pp. 502-511. IEEE, 2014.

Chunbo Lai et al., "Atlas: Baidu's key-value storage system for cloud data," In 2015 31st Symposium on Mass Storage Systems and Technologies (MSST), pp. 1-14. IEEE, 2015.

Wenjie Li et al., "Hilsm: an lsm-based key-value store for hybrid nvm-ssd storage systems," In Proceedings of the 17th ACM International Conference on Computing Frontiers, pp. 208-216, May 11-13, 2020.

Lanyue Lu et al., "Wisckey: Separating keys from values in ssd-conscious storage," ACM Trans. Storage 13, 1, Article 5, Mar. 2017.

Chris Mellor, "Toshiba flashes 100TB QLC flash drive, may go on sale within months. really," Micron, Aug. 10, 2016, https://www.theregister.com/2016/08/10/toshiba100tbqlcssd/.

"QLC NAND Technology," Micron, 2020 https://www.micron.com/products/advancedsolutions/qlc-nand.

Neelima Premsankar, 'What is a "Heterogeneous Memory" Storage Engine (HSE)?' Micron Insight, Jun. 17, 2020, https://www.micron.com/about/blog/2020/june/what-is-a-heterogeneous-storage-engine.

Patrick O'Neil et al., "The log-structured merge-tree (lsm-tree)," Acta Informatica, 33(4):351-385, 1996.

Ashwini Raina et al., "Prismdb: Read-aware log-structured merge trees for heterogeneous storage," Sep. 24, 2020, pp. 1-16.

Pandian Raju et al., "Pebblesdb: Building key-value stores using fragmented log-structured merge trees," In Proceedings of the 26th Symposium on Operating Systems Principles, Oct. 28-31, 2017, pp. 497-514.

"870 QVO," 2022, https://semiconductor.samsung.com/consumer-storage/internal-ssd/870qvo/.

"Samsung 970 evo ssd," 2022, https://semiconductor.samsung.com/consumer-storage/internal-ssd/970evo/.

"Z-ssd redefining fast responsiveness," Samsung Semiconductor Global Website, 2018, https://www.samsung.com/semiconductor/ssd/z-ssd/.

Roshan Sumbaly et al., "Serving large-scale batch computed data with project voldemort," In Proceedings of FAST '12: 10th USENIX Conference on File and Storage Technologies, Feb. 15-17, 2012, pp. 223-235.

Khikmatullo Tulkinbekov and Deok-Hwan Kim. "Casedb: Lightweight key-value store for edge computing environment," Aug. 25, 2020, pp. 149775-149786, IEEE Access, 8:149775-149786.

Kan Wu et al., "Towards an unwritten contract of intel optane SSD," in Proceedings of the 11th USENIX Conference on Hot Topics in Storage and File Systems, Jul. 2019.

Ting Yao et al., "Matrixkv: Reducing write stalls and write amplification in lsm-tree based kv stores with matrix container in nvm," in Proceedings of 2020 USENIX Annual Technical Conference, pp. 17-31, Jul. 15-17, 2020.

Hobin Yoon et al., "Mutant: Balancing storage cost and latency in lsm-tree data stores," in Proceedings of the ACM Symposium on Cloud Computing (SoCC '18), Oct. 11-13, 2018, pp. 162-173.

* cited by examiner

MULTI-LEVEL DATA STORAGE DEVICE AND OPERATION METHOD THEREOF

CROSS-REFERENCE TO RELATED APPLICATION

The present application claims priority under 35 U.S.C. § 119(a) to Korean Patent Application No. 10-2022-0174131, filed on Dec. 13, 2022 and Korean Patent Application No. 10-2023-0098624, filed on Jul. 28, 2023, which are incorporated herein by reference in their entirety.

BACKGROUND

1. Technical Field

Embodiments generally relate to a multi-level data storage device and an operation method thereof, and more particularly, to a multi-level data storage device and an operation method of the multi-level data storage device for improving performance by reducing an imbalance between storage devices in the multi-level data storage device.

2. Related Art

In a multi-level storage device using a log-structured merge (LSM) tree, a data write request performed in the top level storage device and a data movement operation to a lower level storage device are performed in parallel.

An operation of writing data to the top level storage device is referred to as an injection operation, and an operation of moving data to the lower level storage device is referred to as a compaction operation.

Performance of the injection operation is determined by the write performance of the top level storage device. For example, as write performance is improved in a key-value based storage device, the number of key-value sets injected into the top level storage device increases.

Performance of the compaction operation is determined by physical characteristics of storage devices constituting each level. If write performance of a storage device corresponding to a lower level is worse, a latency increases during an inter-level compaction operation.

Although a latency of the injection operation remains constant, if the latency of the compaction operation increases, the number of key-value sets injected into the top level storage device increases due to the injection operation, and thus data subject to the compaction operation increases. As a result, imbalance between the injection operation and the compaction operation further increases.

For example, when configuring a multi-level data storage device including storage devices of different types, such as a single level cell (SLC) based flash memory device and a quadruple level cell (QLC) based flash memory device, QLC based solid state drives (SSDs) having relatively low performance are generally placed at lower levels.

In this way, if a disk of a lower level has a lower bandwidth, the above-mentioned imbalance problem becomes even worse. If the number of key-value sets injected into the top level storage device increases, the number of key-value sets to be compared with an input key increases, resulting in deterioration of overall performance of the multi-level data storage device.

SUMMARY

In accordance with an embodiment of the present disclosure, a multi-level storage device may include a first storage device; a second storage device located at a lower level than the first storage device; an input/output (I/O) control circuit configured to control a first write operation for the first storage device and a second write operation for the second storage device; and an imbalance control circuit configured to calculate an imbalance index corresponding to a write set that is generated when a sum of a number of first write operations and a number of second write operations becomes a predetermined number and configured to control the I/O control circuit to control imbalance of write operations performed in the multi-level data storage device by controlling the first write operation or the second write operation based on the imbalance index.

In accordance with an embodiment of the present disclosure, an operation method of a multi-level storage device having a first storage device storing data according to a first write operation and a second storage device storing data by moving data in the first storage device according to a second write operation, the operation method may include generating a write set when sum of a number of first write operations and a number of second write operations becomes a predetermined number; calculating an imbalance index corresponding to the write set by using a latency of a first write operation and a latency of a second write operation corresponding to the write set; determining imbalance state according to the imbalance index; and controlling imbalance by controlling the first write operation or the second write operation so that an imbalance index corresponding to next write set be enhanced when the imbalance state is determined.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
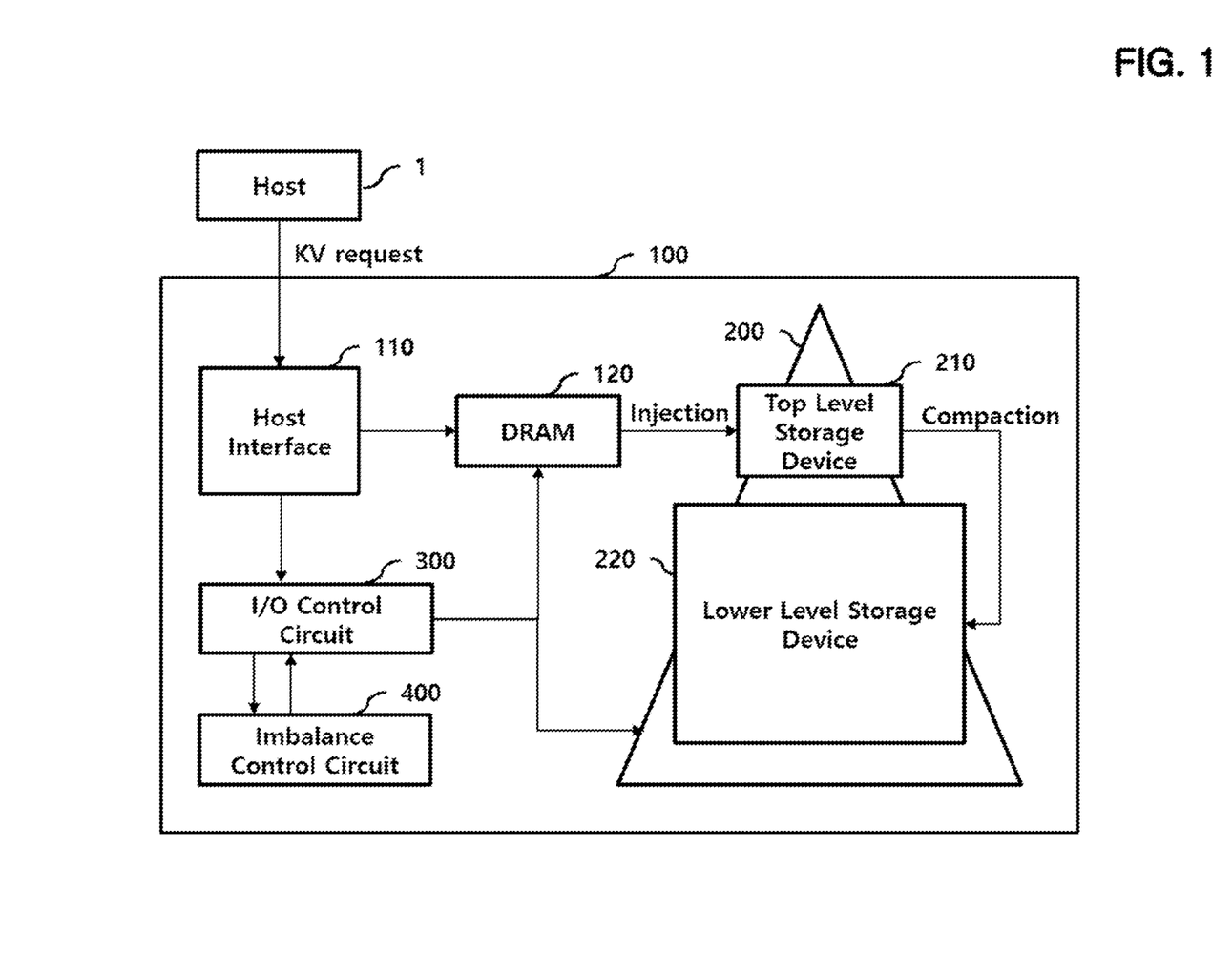
FIG. 1 illustrates a multi-level data storage device according to an embodiment of the present disclosure.

FIG. 1 is a block diagram showing a multi-level data storage device 100 according to an embodiment of the present disclosure.

The multi-level data storage device 100 includes a host interface 110, a dynamic random access memory (DRAM) 120, a storage device 200, an input/output (I/O) control circuit 300, and an imbalance control circuit 400.

The host interface 110 receives a key-value (KV) request provided by a host 1 and transmits a processing result of the KV request to the host 1.

The storage device 200 includes a top level storage device 210 and a lower level storage device 220.

The storage device 200 may be implemented using various types of memory devices. In general, the top level storage device 210 has relatively higher performance than the lower level storage device 220.

For example, a single-level cell (SLC) type NAND flash memory device or a multi-level cell (MLC) type NAND flash memory device may be used as the top level storage device 210, and a triple level cell (TLC) type NAND flash memory device, a quadruple level cell (QLC) type NAND flash memory device, and/or a hard disk drive (HDD) may be used as the lower level storage device 220.

Hereinafter, this embodiment will be described taking a KV type multi-level data storage device using an LSM tree as a data structure, but embodiments of the present invention are not limited thereto.

Hereinafter, the top level storage device 210 may be referred to as a first storage device, and the lower level storage device 220 may be referred to as a second storage device.

In this embodiment, the DRAM 120 and the storage device 200 operate as a KV type data storage device based on the LSM tree.

The top level storage device 210 and the lower level storage device 220 together represent a multi-level data storage device at a physical level, and the LSM tree is a software level data structure.

For example, nodes belonging to one or more uppermost levels of the LSM tree may be stored in the top level storage device 210, and nodes belonging to the other levels than the one or more uppermost levels may be stored in the lower level storage device 220.

In this case, only a write operation for a root node of the LSM tree stored in the top level storage device 210 may correspond to the injection operation, and write operations for the other nodes of the LSM tree stored in the lower level storage device 220 may correspond to the compaction operation.

Hereinafter, the injection operation may be referred to as a first write operation, and the compaction operation may be referred to as a second write operation. The injection operation and the compaction operation will be described in detail below.

In this embodiment, it is assumed that the root node of the LSM tree is stored in the top level storage device 210 and nodes belonging to the remaining levels of the LSM tree are stored in the lower level storage device 220. The root node of the LSM tree corresponds to a node at level 0 and a child node of the root node corresponds to a node at level 1.

However, during an imbalance control operation, the top level storage device 210 may store a part of nodes in the level 1 of the LSM tree as well as the root node of the LSM tree, which will be described in detail below.

The I/O control circuit 300 controls the DRAM 120 and the storage device 200 according to the KV request provided from the host interface 110 to control data I/O operations according to a KV scheme.

The I/O control circuit 300 can control not only data I/O operations but also LSM tree management operations such as injection and compaction operations.

At this time, the LSM tree management operation may be directly performed by the I/O control circuit 300, or the LSM tree management operation may be controlled according to an LSM tree management request transmitted using the KV request. In the latter case, the LSM tree can be managed by an application such as RocksDB running on the host 1, for example.

Since the specific configuration and operation method of the KV type multi-level data storage device using the LSM tree are well known through prior articles such as ⌜ Hao Chen, Chaoyi Ruan, Cheng Li, Xiaosong Ma, and Yinlong Xu. Spandb: A fast, cost-effective lsm-tree based KV store on hybrid storage. In 19th USENIX Conference on File and Storage Technologies (FAST 21), pages 17-32. USENIX Association, February 2021.⌟ and ⌜ Biplob Debnath, Sudipta Sengupta, and Jin Li. Flashstore: High throughput persistent key-value store. Proceedings of the VLDB Endowment, 3(1-2):1414-1425, 2010.⌟, detailed description for the operations of the I/O control circuit 300 is omitted.

The imbalance control circuit 400 monitors an imbalance state of write operations occurring in the storage device 200 and controls the write operations of the storage device 200 accordingly.

The imbalance control circuit 400 may control the operations of the I/O control circuit 300 using a result of monitoring the imbalance state.

In this embodiment, a write set composed of an injection operation and a compaction operation is introduced, and an imbalance index is calculated when a write set is created, and an operation of a multi-level data storage device is controlled by referring to the imbalance index.

In this embodiment, the injection operation refers to an operation of writing a KV set to the top level storage device 210, and the compaction operation refers to an operation of writing a KV set to the lower level storage device 220.

The compaction operation includes a write operation of moving data from the top level storage device 210 to the lower level storage device 220 and a write operation of moving data from a higher level to a lower level among levels inside the lower level storage device 220.

As described above, the injection operation and the compaction operation are performed in the process of managing the LSM tree, and may be performed under the control of the I/O control circuit 300.

The imbalance control circuit 400 detects an imbalance state between injection operations and compaction operations in a write set. When the imbalance state is detected, the imbalance control circuit 400 may control the I/O control circuit 300 to adjust a frequency or cycle of the injection operations or compaction operations.

Figure 2:
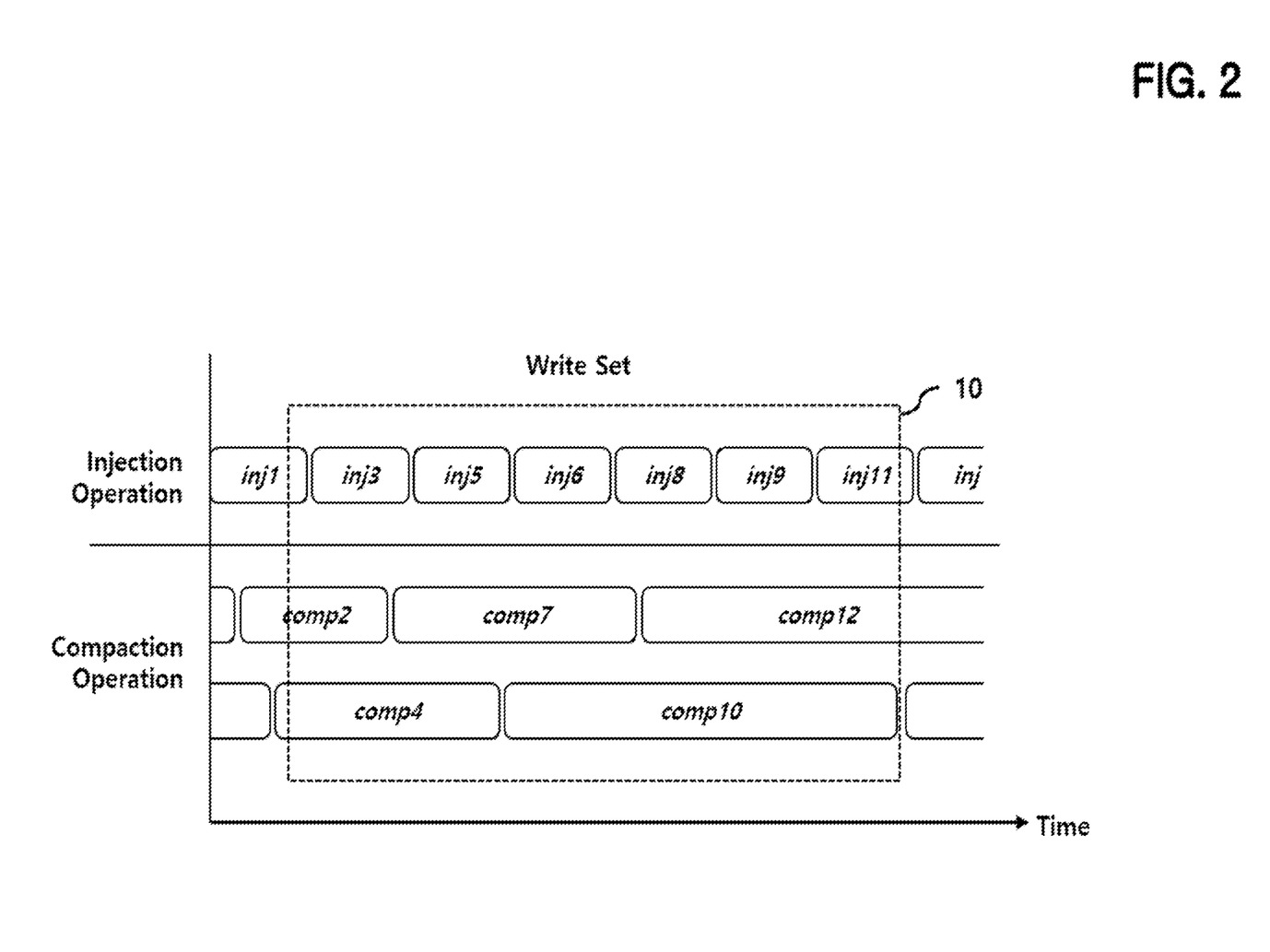
FIG. 2 illustrates a write set according to an embodiment of the present disclosure.

FIG. 2 is a diagram illustrating a write set 10 according to an embodiment of the present disclosure.

In this embodiment, the write set 10 is formed when the sum of the number of injection operations and the number of compaction operations becomes a predetermined number.

In FIG. 2, injection operations are indicated by inj, and compaction operations are indicated by comp.

A compaction operation is divided into several kinds according to a level to which data is moved.

A number attached to each of inj and comp indicates an order of time at which a corresponding write operation ends.

In this embodiment, a write set is created by counting the sum of the number of injection operations and the number of compaction operations based on the order of times when write operations end.

In FIG. 2, it is assumed that the write set 10 is created when the sum becomes 10, and accordingly, the write set 10 includes the write operations indicated by inj1, comp2, inj3, comp4, inj5, inj6, comp7, inj8, inj9, and comp10.

In another embodiment, a write set may be created when the sum becomes 1000 or another number.

When one write set is created, an imbalance index is calculated by referring to the number of injection operations and the number of compaction operations in the corresponding write set.

In the embodiment, the imbalance index is an average latency of compaction operations within the write set divided by an average latency of injection operations within the write set.

A latency of the injection operation or a latency of the compaction operation is a period between a first point of time at which the I/O control circuit 300 instructs a corresponding write operation and a second point of time at which the I/O control circuit 300 receives a corresponding response.

The imbalance control circuit 400 refers to the I/O control circuit 300 to monitor a latency of each write operation, and calculates a corresponding imbalance index whenever a write set is generated.

Equation 1 represents an imbalance index.

$$(\text{Imbalance Index}) = \frac{\sum_j L_{comp,j}/n}{\sum_i L_{inj,i}/m} \quad \text{[Equation 1]}$$

In Equation 1, m is the number of injection operations included in a corresponding write set and n is the number of compaction operations included in the corresponding write set, $L_{inj,i}$ represents a latency of an i-th injection operation, and $L_{comp,j}$ represents a latency of a j-th compaction operation.

The imbalance control circuit 400 compares the imbalance index with a threshold value to determine an imbalance state of the corresponding write set.

In this embodiment, the threshold value may be determined according to a minimum value of an imbalance index. For example, in this embodiment, the threshold value corresponds to twice the minimum value of the imbalance index.

If the imbalance index is greater than the threshold value, it is determined that there is an imbalance of write operations in the write set.

The minimum value of the imbalance index may be updated by referring to an imbalance index calculated whenever a write set is created.

As described above, in the present embodiment, the imbalance between a latency at the top level storage device 210 and a latency at the lower level storage device 220 is monitored using the imbalance index.

In general, since the processing speed of the lower level storage device 220 is lower than the processing speed of the top level storage device 210, KV sets written by the injection operations are accumulated at the top level of the LSM tree stored in the top level storage device 210 due to the slower compaction operation in the lower level storage device 220.

That is, when the latency of the compaction operation is increased, not only the imbalance index in Equation 1 increases, but also read performance of the top level data storage device 210 deteriorates due to the increase in a time required for key search.

Figure 3:
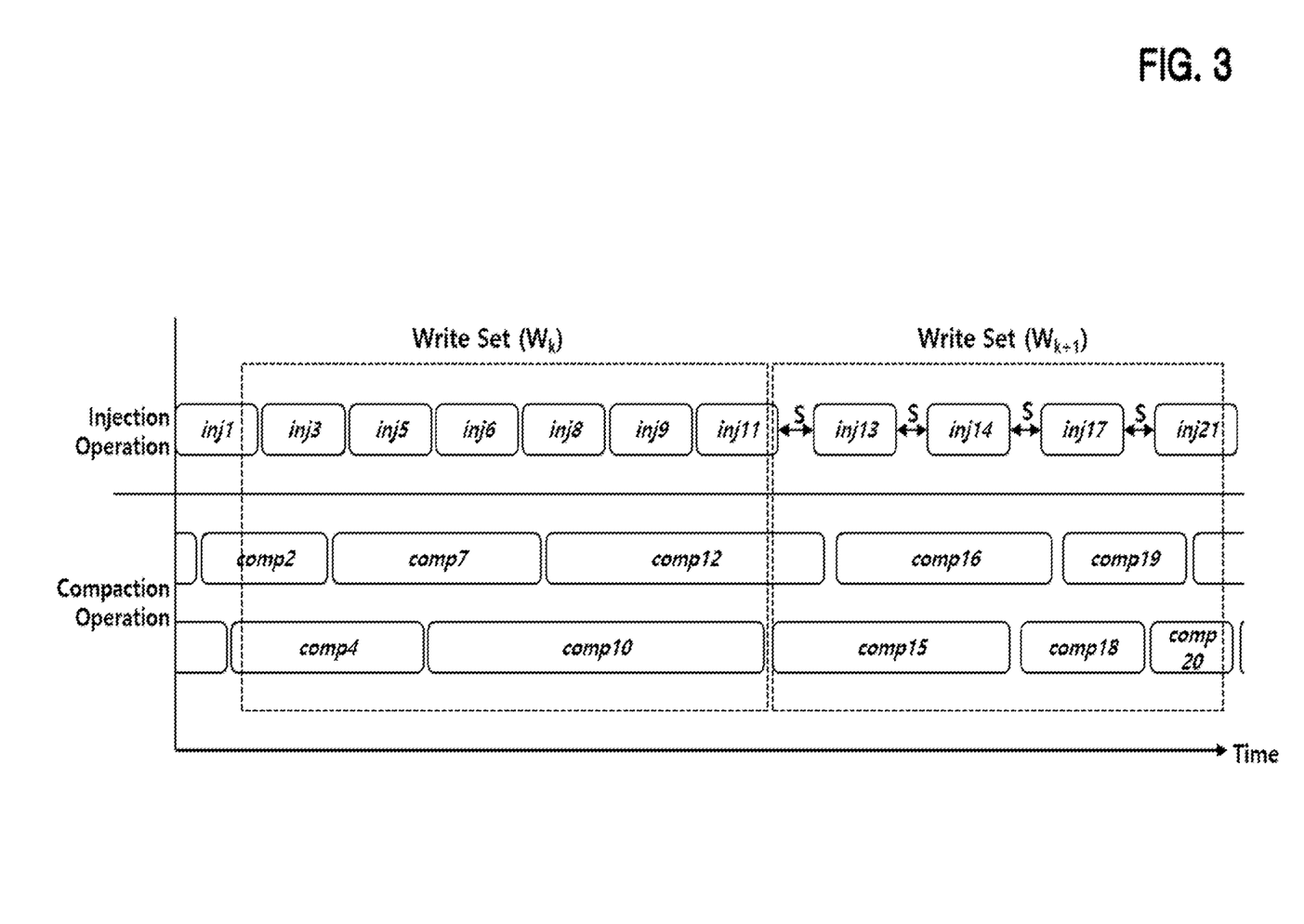
FIGS. 3 and 4 are diagrams illustrating an operation of a multi-level data storage device according to an embodiment of the present disclosure.
Figure 4:
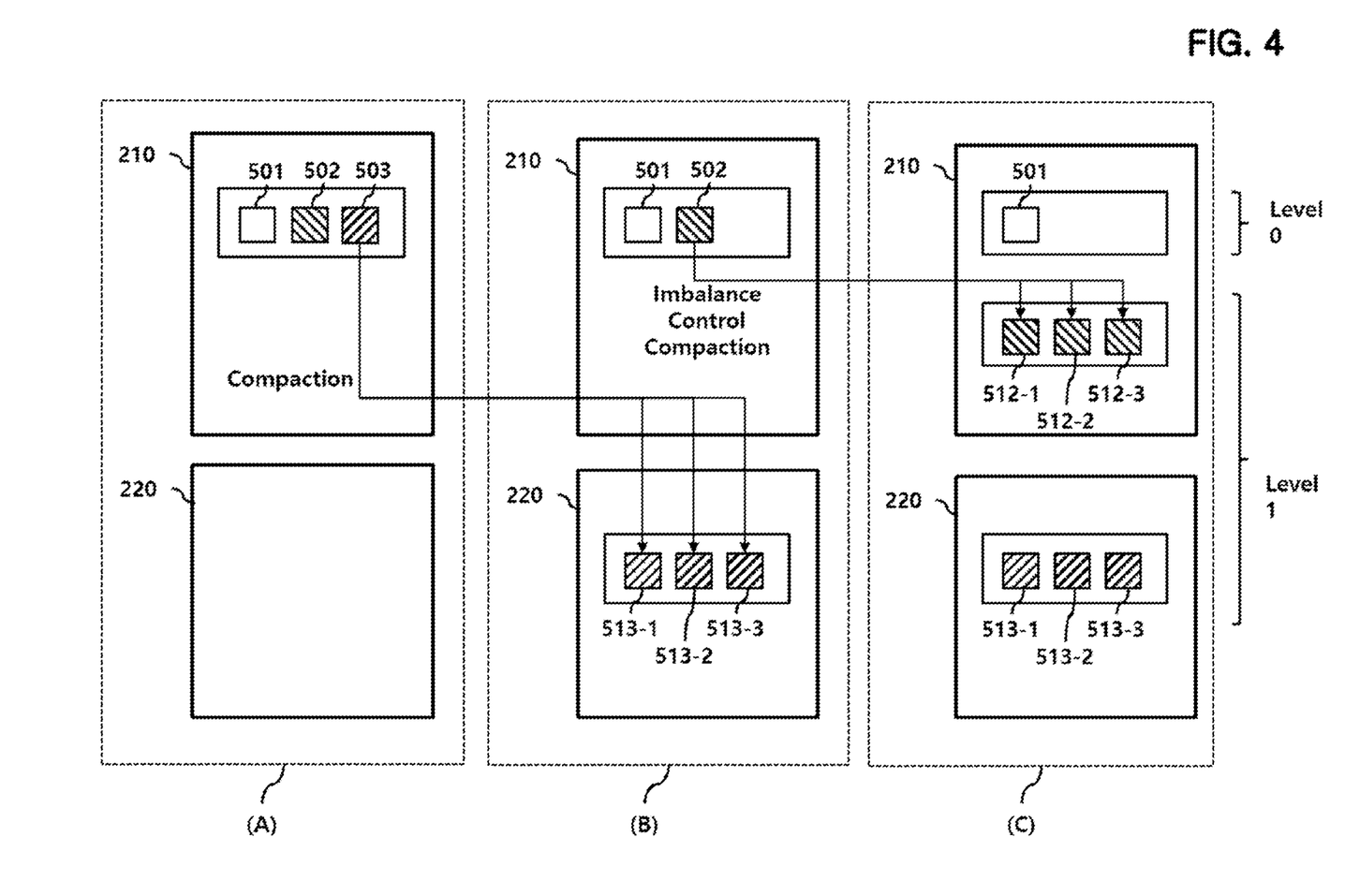

FIGS. 3 and 4 are diagrams illustrating an imbalance control operation according to an embodiment of the present disclosure. The imbalance control operation will be described with reference to FIG. 1.

Hereinafter, the imbalance control operation shown in FIG. 3 will be referred to as a first control operation, and the imbalance control operation shown in FIG. 4 will be referred to as a second control operation.

In FIG. 3, it is assumed that the imbalance control circuit 400 determines that an imbalance index for a k-th write set $W_k$ is greater than a threshold value.

At this time, the imbalance control circuit 400 requests the I/O control circuit 300 to perform the first control operation.

When the first control operation is requested, the I/O control circuit 300 inserts a waiting time S between injection operations. This can be performed by setting a timer in the I/O control circuit 300 before instructing an injection operation.

By inserting the waiting time S between the injection operations, a latency of each injection operation increases, and as a result, an imbalance index for a (k+1)-th write set $W_{k+1}$ can be reduced.

When the latency of the injection operation increases, the KV sets are not accumulated at the root node of the LSM tree stored in the top level storage device 210, and accordingly, the time required for the key search decreases, resulting in improved performance.

In this way, the first control operation may reduce write performance by introducing the waiting time S between the injection operations, but the first control operation reduces the time required for the key search to improve read performance and thereby improves overall processing performance.

FIG. 4 shows the second control operation, and illustrates performing compaction operations when the imbalance state is detected and when the imbalance state is not detected.

First, when the imbalance state is not detected, a normal compaction operation is performed. At this time, a KV set selected at the top level, which is level 0, of the LSM tree is moved to level 1 of the LSM tree.

At this time, the level 0 is located in the top level storage device 210 and the level 1 is formed in the lower level storage device 220. That is, in the normal compaction operation, data is moved from the top level storage device 210 to the lower level storage device 220 and the LSM tree structure is changed accordingly.

As shown in (A), the top level storage device 210 stores KV sets 501, 502, and 503 included in a root node corresponding to the level 0 of the LSM tree. At this time, each KV set includes a plurality of KV pairs.

(B) shows a result of moving the KV set 503 at the level 0 to the level 1 by dividing the KV set 503 into a plurality of sub-KV sets 513-1, 513-2, and 513-3 in the normal compaction operation.

As described above, in the normal compaction operation, the level 1 is formed in the lower level storage device 220.

On the other hand, when the imbalance state is detected, an imbalance control compaction operation is performed instead of the normal compaction operation.

At this time, any one KV set selected from the level 0 of the LSM tree is moved to the level 1.

However, unlike the normal compaction operation, the level 1 is maintained in the top level storage device 210 rather than in the lower level storage device 220.

That is, in the imbalanced control compaction operation, the LSM tree structure is changed, but corresponding data is not moved from the top level storage device 210 to the lower level storage device 220.

Accordingly, the top level storage device 210 stores the level 0 and a part of the level 1 of the LSM tree, and the lower level storage device 220 stores the remaining part of the level 1 of the LSM tree.

(C) shows a result of moving the KV set 502 at the level 0 to the level 1 by dividing the KV set 502 into a plurality of sub-KV sets 512-1, 512-2, and 512-3 in the imbalance control compaction operation.

Since the number of KV sets at the level 0 is reduced by performing the imbalance control compaction operation, the time required for the key search is reduced and the read performance is improved as a result.

In this way, performing the imbalance control compaction operation when the imbalance is detected and performing the normal compaction operation otherwise are referred to as the second control operation.

As described above, when the imbalance index increases in the process of moving data to the lower level storage device 220 having relatively poor performance, data movement from the top level storage device 210 to the lower level storage device 220 may be stopped by performing the second control operation. As a result, it is possible to prevent deterioration of the imbalance index.

That is, the imbalance index may be improved without increasing the latency of the injection operation by performing the second control operation.

In addition, since the number of KV sets at the level 0 is reduced by performing the second control operation, the time required for the key search is reduced, which contributes overall performance enhancement in workloads including searching operations.

However, when the second control operation is continuously performed, a new KV set may not be added to the level 0 since a storage space in the top level storage device 210 is reduced by an injection operation.

Accordingly, in this embodiment, when a used storage space of the top level storage device 210 exceeds a space threshold, the second control operation is stopped and data corresponding to the level 1 in the top level storage device 210 is moved to the lower level storage device 220. This can be referred to as a third control operation, and in this embodiment, 80% of the entire storage space of the top level storage device 210 is set as the space threshold.

Figure 5:
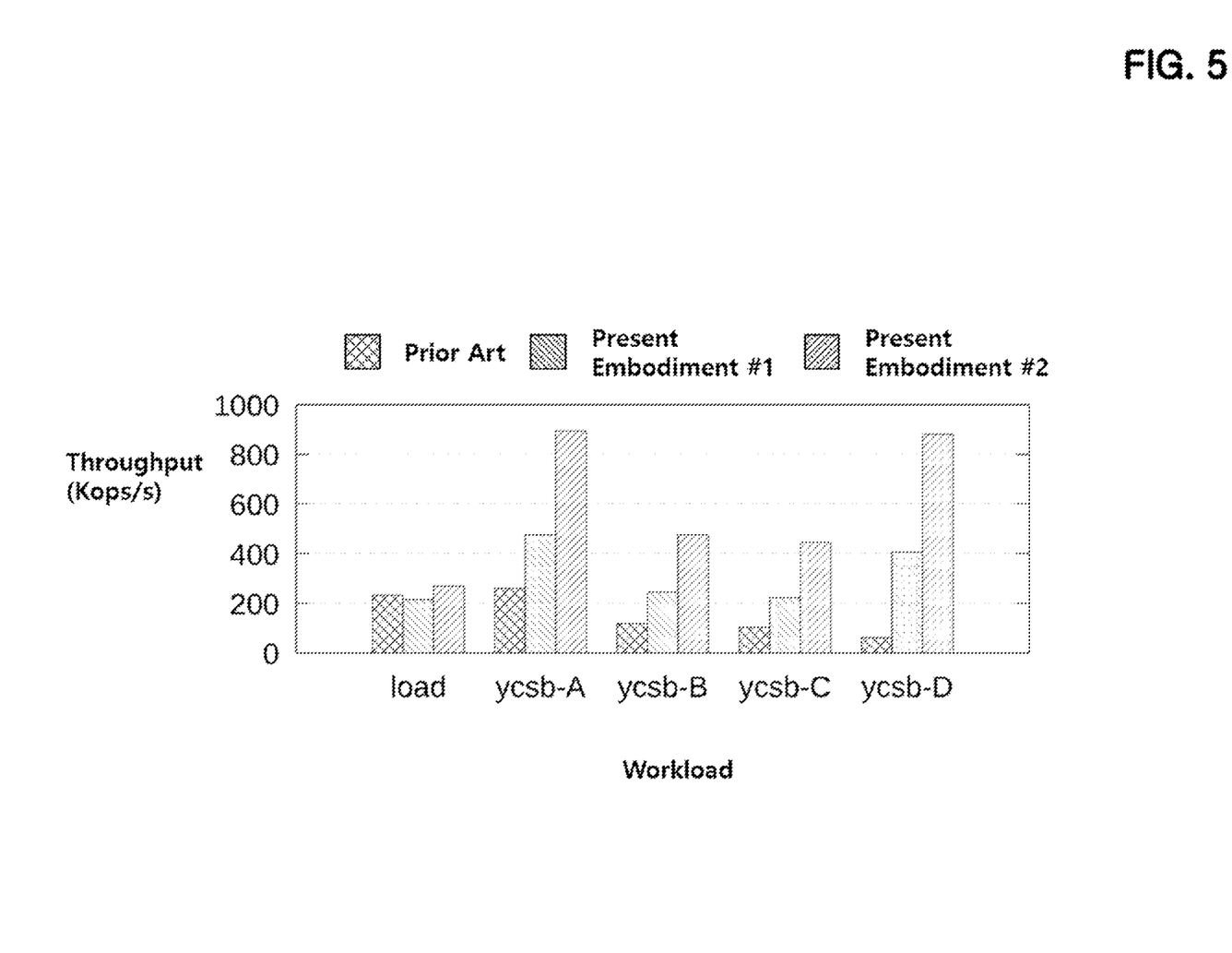
FIG. 5 is a graph illustrating an effect of a multi-level data storage device according to an embodiment of the present disclosure.

FIG. 5 is a graph showing the effect of the multi-level data storage device according to the embodiment of the present disclosure.

In the case of the prior art shown in the graph, the first control operation and the second control operation are not performed.

In the graph, Example 1 is a case in which only the first control operation is performed, and Example 2 is a case in which the third control operation is performed together with the second control operation.

In the graph, the horizontal axis represents an operation using the YCSB workload disclosed in the article [ Brian F. Cooper, Adam Silberstein, Erwin Tam, Raghu Ramakrishnan, and Russell Sears. Benchmarking cloud serving systems with ycsb. In Proceeding of the 1st ACM Symposium on Cloud computing (SoCC '10), 2010.⌋.

The operation using the YCSB workload includes a load operation and an execution operation.

On the horizontal axis, the load operation is indicated as "load," and the execution operation is indicated as "ycsb-A," "ycsb-B," "ycsb-C," and "ycsb-D."

The load operation represents an operation of storing a predetermined number of KV sets in the storage device 200 prior to the execution operation.

ycsb-A, ycsb-B, ycsb-C, and ycsb-D represent four execution operations corresponding to different execution conditions.

As shown in the graph, it can be confirmed that throughputs in the present embodiments are significantly greater than a throughput in the prior art.

Although various embodiments have been illustrated and described, various changes and modifications may be made to the described embodiments without departing from the spirit and scope of the invention as defined by the following claims.

What is claimed is:

1. A multi-level data storage device comprising:
a first storage device;
a second storage device located at a lower level than the first storage device;
an input/output (I/O) control circuit configured to control a first write operation for the first storage device and a second write operation for the second storage device; and
an imbalance control circuit configured to calculate an imbalance index corresponding to a write set that is generated when a sum of a number of first write operations and a number of second write operations becomes a predetermined number, and configured to control the I/O control circuit to control imbalance of write operations performed in the multi-level data storage device by controlling the first write operation or the second write operation based on the imbalance index,
wherein the imbalance control circuit calculates the imbalance index by dividing an average latency of the second write operations included in the write set by an average latency of the first write operations included in the write set, and
wherein, when the write set is a first write set, the imbalance control circuit controls the I/O control circuit to reduce an imbalance index for a second write set when the imbalance index for the first write set indicates an imbalance state, the second write set being generated to follow the first write set.

2. The multi-level storage device of claim 1, wherein the imbalance control circuit monitors a minimum value of an imbalance index and generates a threshold value from the minimum value to be compared with the imbalance index.

3. The multi-level storage device of claim 1, wherein the imbalance control circuit controls the I/O control circuit to insert a predetermined waiting time between first write operations included in the second write set when the imbalance state is determined.

4. The multi-level storage device of claim 1, wherein the first storage device and the second storage device each store a key-value (KV) set according to levels of a log-structured merge (LSM) tree,
wherein the first storage device stores a plurality of KV sets corresponding to level 0 of the LSM tree, and wherein when the imbalance state is determined, the imbalance control circuit controls the I/O control circuit to change a KV set corresponding to the level 0 into one or more KV sets corresponding to level 1 to keep the one or more KV sets corresponding to the level 1 in the first storage device.

5. The multi-level storage device of claim 4, wherein when a used storage space of the first storage device exceeds a space threshold, the imbalance control circuit controls the I/O control circuit to move the one or more KV sets corresponding to the level 1 stored in the first storage device to the second storage device.

6. The multi-level storage device of claim 4, wherein if the imbalance state is not determined, the imbalance control circuit controls the I/O control circuit to store the one or more KV sets corresponding to the level 1 in the second storage device when the KV set corresponding to the level 0 is changed to the one or more KV sets in the level 1.

7. An operation method of a multi-level data storage device including a first storage device storing data by performing a first write operation and a second storage device storing data by moving the data stored in the first storage device to the second storage device by performing a second write operation, the operation method comprising:
    generating a first write set when a sum of a number of first write operations and a number of second write operations becomes a predetermined number;
    calculating an imbalance index corresponding to the first write set by using an average latency of the first write operations and an average latency of the second write operations corresponding to the first write set;
    determining an imbalance state based on the imbalance index; and
    controlling imbalance of write operations performed in the multi-level data storage device by controlling the first write operation or the second write operation so that an imbalance index corresponding to a second write set is reduced when the imbalance state is determined, the second write set being generated to follow the first write set,
    wherein calculating the imbalance index includes dividing an average latency of second write operations by an average latency of first write operations, corresponding to the first write set.

8. The operation method of claim 7, wherein determining the imbalance state includes:
    monitoring a minimum value of the imbalance index and determining a threshold value from the minimum value; and
    comparing the threshold value with the imbalance index.

9. The operation method of claim 7, wherein controlling the imbalance includes inserting a predetermined waiting time between first write operations in the second write set.

10. The operation method of claim 7, wherein the first storage device and the second storage device each store a key-value (KV) set according to levels of a log-structured merge (LSM) tree, and the first storage device stores a plurality of KV sets corresponding to level 0 of the LSM tree,
    wherein when the imbalance state is determined, controlling the imbalance includes:
    changing a KV set corresponding to the level 0 to one or more KV sets corresponding to level 1; and
    storing the one or more KV sets corresponding to the level 1 in the first storage device without performing the second write operation.

11. The operation method of claim 10, wherein controlling the imbalance further includes:
    determining whether a used storage space of the first storage device exceeds a space threshold; and
    performing a second write operation to move the one or more KV sets stored in the first storage device to the second storage device when the storage space exceeds the storage threshold.

* * * * *